Dec. 31, 1957     L. W. OVERSTREET     2,818,264
GRIPPING MECHANISM FOR USE IN EXPANDING
MANDRELS AND CONTRACTING COLLETS
Filed Jan. 9, 1956

INVENTOR.
LESLIE W. OVERSTREET
BY
Fulwider, Mattingly + Huntley
ATTORNEYS.

United States Patent Office 2,818,264
Patented Dec. 31, 1957

2,818,264

GRIPPING MECHANISM FOR USE IN EXPANDING MANDRELS AND CONTRACTING COLLETS

Leslie W. Overstreet, Puente, Calif.

Application January 9, 1956, Serial No. 558,023

14 Claims. (Cl. 279—2)

My invention relates in general to machine tool and work-piece holders of the expanding mandrel and contracting collet type, and more particularly to an improved type of gripping mechanism for use in such devices.

The usual purpose of a contracting collet is to grip a cylindrical work-piece or the shank of a tool, such as a drill or reamer, to rotate the same about the cylindrical axis. Thus, it is important that such collets maintain accurate concentricity of the gripping surface despite the contracting movement thereof. Similar accurate concentricity must be maintained in the case of arbors and mandrels which may be used to internally grip a tubular work-piece or the like by expansion.

It is also important that expanding mandrels or contracting collets firmly grip a work-piece with controlled and uniformly distributed pressure, since they are frequently used to hold fragile work-pieces which may be distorted if subjected to excessive gripping pressure. When these devices are used to hold a fragile work-piece, it is necessary that a delicate compromise be achieved between applying sufficient pressure to grip the piece properly and yet not so much that deformation takes place. It is, therefore, advantageous that the gripping action be as uniform as possible, both longitudinally and around the circumference of the gripped surface in order to allow maximum distribution of the gripping pressure over the surface. Furthermore, such a uniform distribution of gripping pressure is beneficial in avoiding misalignment of the work-piece with respect to the rotary axis.

The expanding mandrels and contracting collets presently in use have several disadvantages. One form of conventional gripping mechanism does not grip the work-piece evenly around the complete circumference, but instead makes contact only at certain angularly spaced positions. This means that the gripping pressure is concentrated at particular points on the circumference of the gripping surface. When the gripping pressure is thus concentrated, there is a greater possibility of deformation of a fragile work-piece than if the same amount of gripping pressure were more uniformly distributed over the surface. Also, there is a serious reduction in the effective gripping area.

Another form of gripping arbor employs a tapered gripping surface which is driven into the bore of the work-piece. The latter arrangement is unsatisfactory in that it concentrates the gripping pressure at one end of the bore and also fails to maintain the bore parallel to the arbor axis.

Other disadvantages of conventional devices of the class described are that they are complicated, expensive to manufacture, and sometimes difficult to operate.

With the foregoing in mind, it is a major object of my invention to provide a gripping mechanism for use in expanding mandrels, contracting collets and similar devices, which applies a relatively uniform gripping pressure both longitudinally and around the circumference of the gripped surface of a work-piece.

Another object of my invention is to provide a gripping mechanism which is easily controllable to a desired gripping pressure.

A further object of my invention is to provide a gripping mechanism which may be easily adapted to a variety of sizes of work-pieces.

Still another object of my invention is to provide a gripping mechanism which is simple to operate and inexpensive to manufacture.

My invention provides a new type of gripping mechanism for use in expanding mandrels, contracting collets and other similar devices, which obviates the above-described disadvantages of earlier devices. Devices embodying my invention make use of a helix of resilient material for the gripping member, the gripping pressure being distributed over the circumference of the gripped surface along a helical path. This produces a more uniform distribution of gripping pressure, thus allowing greater pressures to be used without deformation of a fragile work-piece, and lessening the risk of misalignment. My helix type gripping member is easily controllable to effect desired gripping pressure, is simple to operate, and inexpensive to manufacture. Because of the helical nature of the gripping member, the gripping pressure is distributed uniformly throughout the gripped surface longitudinally, both axially and circumferentially.

The foregoing and other objects and advantages of my invention will become apparent from the following detailed description of two presently preferred forms thereof, and from an inspection of the accompanying drawings in which.

Figure 1:
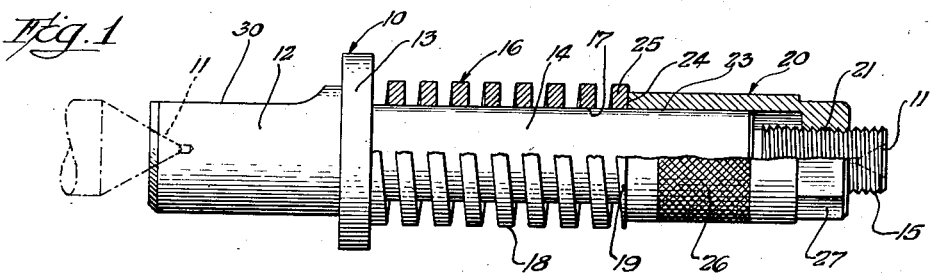
Figure 1 is a side elevation, partially in section, showing my invention embodied in an expanding mandrel.

Referring to the drawings, and particularly to Figure 1 thereof, the numeral 10 designates a shaft having conical center receiving sockets 11 in each end, and having a drive portion 12 at one end, a shoulder 13 adjacent the drive portion, a main body portion 14 adjacent the shoulder and a threaded portion 15 at the opposite end. Mounted on the main body portion 14 of the shaft 10 is a helix 16 made of resilient material, such, for example, as spring steel, which has an accurately formed inner bore 17 designed to fit snugly over the outer surface of the main body portion 14. The helix 16 also has an accurately formed outer circumference 18, thus giving an exact radial spacing between the circumference of the inner bore 17 and the outer circumference 18. While the helix shown is cylindrical, i. e., all turns are of the same diameter, it will be noted that devices embodying my invention may employ stepped cylindrical helices or conical helices. The individual turns of the helix 16 are, preferably, rectangular in cross-section as shown, and the end turns of the helix are tapered or wedge-shaped as shown at 19 to form a square abutting surface at each end of the helix.

The helix 16 is held in position on the shaft 10 by a threaded sleeve 20. The sleeve 20 is internally threaded at one end, as shown at 21, to engage the threaded end 15 of the shaft 10. The opposite end of the sleeve has an inner bore 23 large enough to loosely receive the main body portion 14 of the shaft. The end of the sleeve has a bearing surface at 24 against which the endmost coil 25 of the helix 16 rests, thus providing means whereby the helix may be compressed or released when the sleeve is rotated on the threaded shaft portion 15.

To facilitate rotation of the sleeve 20 on the shaft, the outer surface of the sleeve has a knurled portion 26 and wrench surfaces 27 for final tightening.

Figure 2:
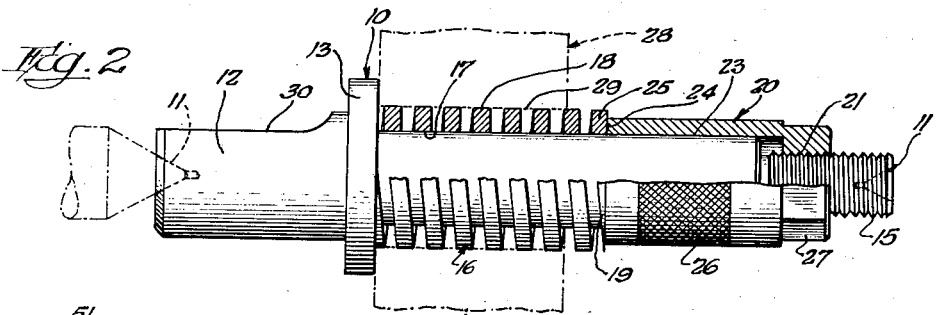
Figure 2 is a similar view of the mandrel of Figure 1 showing a work-piece held thereon by the gripping mechanism.

Referring to Figure 2, the operation of my invention in its expanding mandrel form is as follows. A work-piece 28 having a cylindrical bore 29 just slightly larger than the outer diameter 18 of the helix 16 when uncompressed, as shown in Figure 1, is placed over the outer circumference of the helix and is seated against the shoulder 13 which acts as an abutment. The work-piece is then gripped by the mandrel by rotating the sleeve 20 to press its bearing surface 24 against the endmost coil 25 of the helix. This action compresses the resilient helix between the abutment shoulder 13 and the surface 24 and forces the individual helix turns against the inner surface of the work-piece bore 29. This gripping action applies an evenly distributed pressure along the helical path of contact, and therefore provides an excellent gripping and centering means for holding the work-piece.

The gripping action of the helix is difficult to analyze, but appears to be due to an elastic deformation of the helix cross-section. It is to be noted that the axial compression of the helix not only causes outward pressure against the bore 29 of the work-piece, but also causes inward pressure against the main body portion 14. This inward and outward pressure securely locks the work-piece 28 to the shaft 10 whereby the work-piece may be power driven in either direction.

Drive torque may be transmitted to the mandrel through a lathe dog, for example, placed on the drive portion 12 and seated against a flat 30 thereon. From the shaft 10, such torque is transmitted to the work-piece through the gripping action of the helix 16.

To release the work-piece 28 from the shaft 10 the sleeve 20 is merely unscrewed sufficiently to release the axial pressure on the helix 16. The latter then returns to its initial unstressed condition, shown in Figure 1, whereupon the work-piece may be slipped off.

Figure 3:
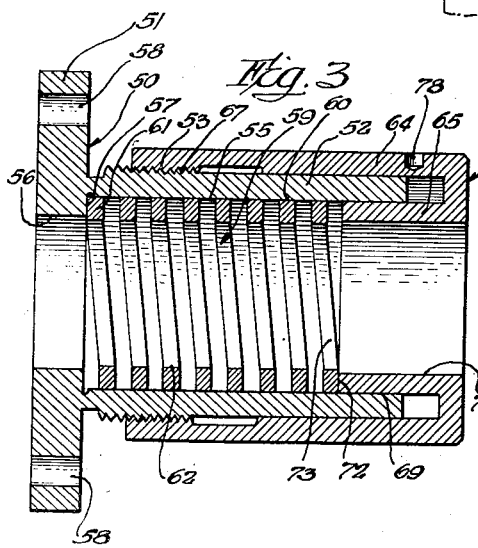
Figure 3 is a side elevation, partially in section, showing my invention embodied in a contracting collet.

In Figure 3 I have illustrated my invention in a contracting collet. The numeral 50 designates a flanged sleeve having a flange 51 at one end of a cylindrical main body 52. The main body 52 has external threads 53 adjacent the flange 51.

The sleeve 50 has an axial bore having a major section 55 through the main body somewhat larger in diameter than a short terminal section 56 through the flange 51. This provides an annular shoulder 57 on the inner surface of the axial bore at the junction of the two sections.

The flange 51 is provided with angularly spaced holes 58 near its outer circumference for use in attaching the flange to the face plate (not shown) of a machine tool.

A helix 59 similar to that of the previously described embodiment and having an outside diameter 60 slightly smaller than that of the bore section 55 is fitted snugly into this bore section such that the innermost turn 61 of the helix 59 seats against the shoulder 57. The internal diameter 62 of the helix 59 is slightly smaller than the bore section 56.

A cap member 63, comprising concentrically connected cylindrical outer and inner sleeves 64 and 65, is provided for the purpose of compressing the helix 59. The outer sleeve 64 of the cap 63 is formed to fit over the main body 52 and internal threads 67 are provided and engage the threads 53 on the outer surface of the sleeve 50 when the cap is so positioned.

The inner sleeve 65 of the cap 63 has an exterior surface 69 smaller than the bore section 55 so that it will fit freely therein. A bore 70 equal in size to the bore section 56 extends axially through the cap 63.

When the cap 63 is assembled onto the sleeve 50 by engaging the cap threads 67 with external threads 53, the inner sleeve 65 of the cap, which has a bearing surface 72 perpendicular to its axis, bears against the outermost turn 73 of the helix 59, compressing the latter against the shoulder 57 which acts as an abutment.

To aid in threading the cap 63 onto the sleeve 50, hole 78 is provided in the outer surface of the cap and plug to allow use of capstan wrench.

Figure 4:
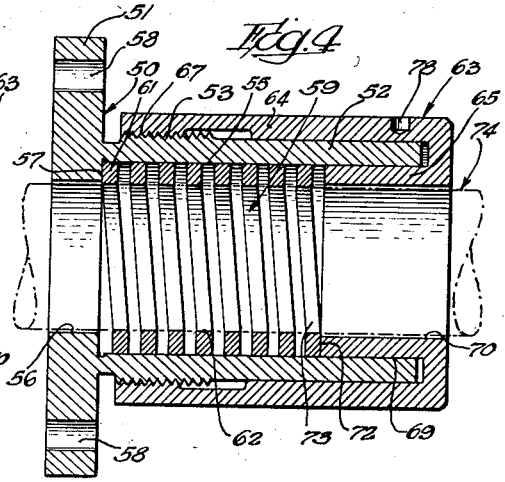
Figure 4 is a view similar to Figure 3 showing a work-piece held by the gripping mechanism.

Figure 4 shows the contracting collet with a work-piece held in place. In operation a cylindrical object 74 to be held in the collet is inserted into the axial bore 62 of the helix 59. The helix bore 62 is, when the helix is unstressed, slightly larger than the object to be held.

After the object 74 is inserted, the cap 63 is then tightened onto the threads 53 and the helix 59 is compressed as aforesaid. This compression forces the turns of the helix to tighten around the cylindrical portion of the work-piece and thereby to apply an evenly distributed gripping pressure along the helical path of contact, thus providing an excellent means for gripping and centering the work-piece.

As previously described, the axial compression of the helix causes both outward pressure against the bore section 55 and inward pressure against the surface of object 74 being gripped. This action securely locks the object 74 to the sleeve 50 whereby the object may be power driven in either direction.

Driving power may be applied to the sleeve 50 by attaching it to a machine tool through holes 58. It is transmitted to the work-piece through the gripping action of the helix.

To release the gripped object 74 from the sleeve 50, the cap 63 is merely unthreaded sufficiently to release the axial pressure on the helix 59. The helix then returns to its unstressed condition and the object may be removed.

It should be understood that these embodiments of my invention may be readily adapted for various sized work-pieces by using helices of different cross-sectional configuration to give different radial spacing between the inner and outer surfaces. Major size changes may be made by changing the complete supporting structure as well as the helix.

While the forms of my invention herein shown and described in detail are fully capable of achieving the objects and providing the advantages hereinbefore stated, it is to be understood that they are primarily illustrative of presently preferred embodiments of my invention and that I do not mean to limit myself to the details of construction of the designs herein shown, other than as defined in the appended claims.

I claim:

1. A gripping mechanism comprising: a resilient helix having spaced turns defining inner and outer surfaces; a rigid member engaged with a first of said surfaces to limit radial movement of said helix in the direction of said first surface, the other of said surfaces being exposed to engage an object to be gripped by said helix when axially compressed; an abutment formed on said rigid member; and a movable member mounted on said rigid member for axially compressing the helix against said abutment to grip an object placed against said exposed surface.

2. A gripping mechanism comprising: a rigid member; a resilient helix having spaced coils defining inner and outer surfaces, one of said surfaces being in limiting engagement with said rigid member and the other being exposed; an abutment formed on said rigid member; and a movable member mounted on said rigid member for axially compressing the helix against said abutment.

3. A gripping mechanism comprising: a resilient helix having spaced turns defining inner and outer cylindrical surfaces; a rigid member engaged with a first of said surfaces to support the same and to limit radial movement of said helix in the direction of said first surface, the other of said surfaces being exposed to engage an object to be gripped by said helix when axially compressed; said rigid member having means connecting it to a machine for rotation about the axis of said helix and having a shoulder formed thereon; and a sleeve in threaded engagement with said rigid member and positioned and adapted to bear against one end of said helix thereby axially compressing said helix between said sleeve and said shoulder.

4. A gripping mechanism comprising: an elongate rotary member; a resilient helix having spaced coils defining inner and outer cylindrical surfaces, one of said surfaces being in limiting engagement with said member and the other being exposed; said member having means for drivingly connecting said helix to a machine for rotation about its axis, and having a shoulder formed thereon; and a threaded sleeve in threaded engagement with said member and positioned and adapted to bear against one end of said helix thereby axially compressing said helix between said sleeve and said shoulder.

5. A gripping mechanism comprising: a sleeve; a resilient helix having its bore exposed and its outer surface in limiting engagement within said sleeve; and means for axially compressing said helix to cause the same to contract and thereby engage an object in said bore.

6. A gripping mechanism comprising: a resilient helix having spaced coils: and a shaft engaged with the bore of said helix to limit inward radial movement of said helix and to support said helix, said shaft having a shoulder formed thereon and a sleeve threaded thereon for axially compressing the helix against said shoulder, the outer surface of said helix being exposed to engage a bore in an object to be gripped by said helix when compressed as aforesaid.

7. An expanding mandrel comprising: a resilient helix having spaced coils, an inner bore, and an outer cylindrical surface; a shaft positioned to fit snugly in the bore of said helix thereby limiting its inward radial movement and supporting said helix, said shaft having center holes in each end to receive centers for supporting said shaft on a rotary axis defined by said centers; an extension on said shaft adapted to connect said shaft to a power source for rotation thereof; a shoulder formed on said shaft for engagement with one end of said helix; a threaded portion formed on said shaft and spaced from said shoulder; and a threaded sleeve engaged with said threaded portion for threading movement on said shaft, said sleeve being in engagement with the opposite end of said helix and thereby axially compressing said helix upon movement of said sleeve towards said shoulder, the outer surface of said helix being exposed to engage a bore in an object to be gripped by said helix when compressed as aforesaid.

8. A collet comprising: a resilient helix having spaced coils and inner and outer cylindrical surfaces; a sleeve snugly receiving said helix thereby confining said helix and limiting its radial movement in an outward direction, said sleeve having an annular shoulder in the bore thereof in engagement with one end of said helix; an end flange formed on said sleeve for connecting said sleeve to a power source for rotation thereby; a threaded portion formed on said sleeve; and a cap having threads engaging said threaded portion on said sleeve and a plug portion fitting inside of said sleeve bore, said plug being in engagement with the opposite end of said helix and thereby axially compressing said helix against said shoulder upon threading movement of said cap on said sleeve, the inner surface of said helix being exposed to engage the outer surface of an object placed therein to be gripped by said helix when compressed as aforesaid.

9. The mechanism of claim 2 further characterized in that the cross section of each of said coils taken in a plane through the axis of said helix is a rectangle having two of its sides parallel to said axis.

10. The mechanism of claim 9 further characterized in that the radial dimension of said rectangle substantially exceeds the dimension thereof parallel to said axis.

11. The mechanism of claim 4 further characterized in that the cross section of each of said coils taken in a plane through the axis of said helix is a rectangle having two of its sides parallel to said axis.

12. The mechanism of claim 11 further characterized in that the radial dimension of said rectangle substantially exceeds the dimension thereof parallel to said axis.

13. The mechanism of claim 5 in which said helix is comprised of a coiled member of rectangular cross section arranged with two opposite sides thereof in cylindrical alignment to form said outer surface and said bore.

14. The mechanism of claim 13 further characterized in that the radial dimension of the cross section of said member coiled as aforesaid substantially exceeds the dimension thereof parallel to the axis of said helix.

References Cited in the file of this patent
UNITED STATES PATENTS

| | | |
|---|---|---|
| 775,579 | Rich | Nov. 22, 1904 |
| 1,215,785 | Everroad | Feb. 13, 1917 |